United States Patent
Kondaveeti et al.

(10) Patent No.: US 10,313,390 B1
(45) Date of Patent: Jun. 4, 2019

(54) DISCOVERING DOMAIN ASSOCIATIONS FOR WATERING HOLE ATTACK DETECTION

(71) Applicant: EMC Corporation, Hopkinton, MA (US)

(72) Inventors: Anirudh Kondaveeti, Foster City, CA (US); Jin Yu, Melbourne (AU)

(73) Assignee: EMC IP Holding Company, LLC, Hopkinton, MA (US)

( * ) Notice: Subject to any disclaimer, the term of this patent is extended or adjusted under 35 U.S.C. 154(b) by 323 days.

(21) Appl. No.: 14/976,156

(22) Filed: Dec. 21, 2015

Related U.S. Application Data (60) Provisional application No. 62/215,624, filed on Sep. 8, 2015.

(51) Int. Cl.
  *H04L 29/06* (2006.01)
(52) U.S. Cl.
  CPC ...... *H04L 63/1441* (2013.01); *H04L 63/1425* (2013.01)
(58) Field of Classification Search
  CPC .................. H04L 63/1441; H04L 63/1425
  USPC ......................................................... 726/23
  See application file for complete search history.

(56) References Cited

U.S. PATENT DOCUMENTS

| 2005/0071465 | A1* | 3/2005 | Zeng ................. | G06F 17/30867 709/224 |
| 2011/0283357 | A1* | 11/2011 | Pandrangi ........... | H04L 63/1425 726/22 |
| 2016/0156655 | A1* | 6/2016 | Lotem .................. | H04L 63/145 726/23 |
| 2017/0032274 | A1* | 2/2017 | Yu ...................... | G06F 17/30598 |
| 2017/0041333 | A1* | 2/2017 | Mahjoub ............. | H04L 61/1511 |

FOREIGN PATENT DOCUMENTS

WO  WO 2013143878 A2 * 10/2013 ....... G06F 17/30867

OTHER PUBLICATIONS

Akoglu et al., What is Strange in Large Networks? Graph-based Irregularity and Fraud Detection, International Conference on Data Mining, Brussels, Dec. 10, 2012.
Akoglu et al., OddBall: Spotting Anomalies in Weighted Graphs, PAKDD, Hyberabad, India, Jun. 2010.
Mohammed J. Zaki, SPADE: An Efficient Algorithm for Mining Frequent Sequences, Machine Learning, vol. 42, Issue 1-2, 2001.
Agrawal et al., Fast Algorithms for Mining Association Rules, Proceedings of the 20th VLDB Conference, Santiago, Chile, 1994.

* cited by examiner

*Primary Examiner* — Harunur Rashid
*Assistant Examiner* — Sakinah White Taylor
(74) *Attorney, Agent, or Firm* — Barry N. Young (57) ABSTRACT

One or more proxy logs are processed in order to generate a plurality of domain sequences. One or more domain sequences which have low support and high confidence within the plurality of domain sequences are identified. The identified domain sequences are flagged as including one or more of the following: an infected watering hole domain or an exploit kit host.

11 Claims, 10 Drawing Sheets

Connection Time and Domain Information
for a Given User

Create domain sequences, removing
any second/subsequent visits to
duplicate domains within a session

| Session ID | Domain Sequence | |
|---|---|---|
| 1 | <{googlevideo.com}, {ytimg.com}, {youtube.com}, {doubleclick.net}, {ggpht.com, google.com}> | 460 |
| 2 | <{rambler.ru}, {criteo.com}> | 462 |

$$confidence(<\{A\},\{B\}> => <\{C\}>) := \frac{support(<\{A\},\{B\},\{C\}>)}{support(<\{A\},\{B\}>)}$$

$$= \frac{|<\{A\},\{B\},\{C\}>|}{(|<\{A\},\{B\}>|)} \quad \text{— 702}$$

← 700

$$relative\_confidence(<\{A\},\{B\}> => <\{C\}>) := \frac{|<\{A\},\{B\},\{C\}>|}{min(|\{A\}|_{fullset},|\{B\}|_{fullset})}$$

DISCOVERING DOMAIN ASSOCIATIONS FOR WATERING HOLE ATTACK DETECTION

CROSS REFERENCE TO OTHER APPLICATIONS

This application claims priority to U.S. Provisional Patent Application No. 62/215,624 entitled DISCOVERING DOMAIN ASSOCIATIONS FOR WATERING HOLE ATTACK DETECTION filed Sep. 8, 2015 which is incorporated herein by reference for all purposes.

BACKGROUND OF THE INVENTION

Watering hole attacks are an attack in which a legitimate domain (e.g., a website) is infected and the infection causes the domain to forward visitors to a second, malicious domain. The second, malicious domain hosts an exploit kit which is downloaded to the visitor's device and may be used to steal the credentials of the visitor (e.g., username, password, etc.). New techniques which are able to detect watering hold attacks would be desirable. It would be even more desirable if such detection techniques were able to process large amounts of data in a relatively short amount of time. Typically, security-related detection processes must ingest large amounts of data and it would be desirable if new watering hole attack detection techniques could complete in a relatively short amount of time.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
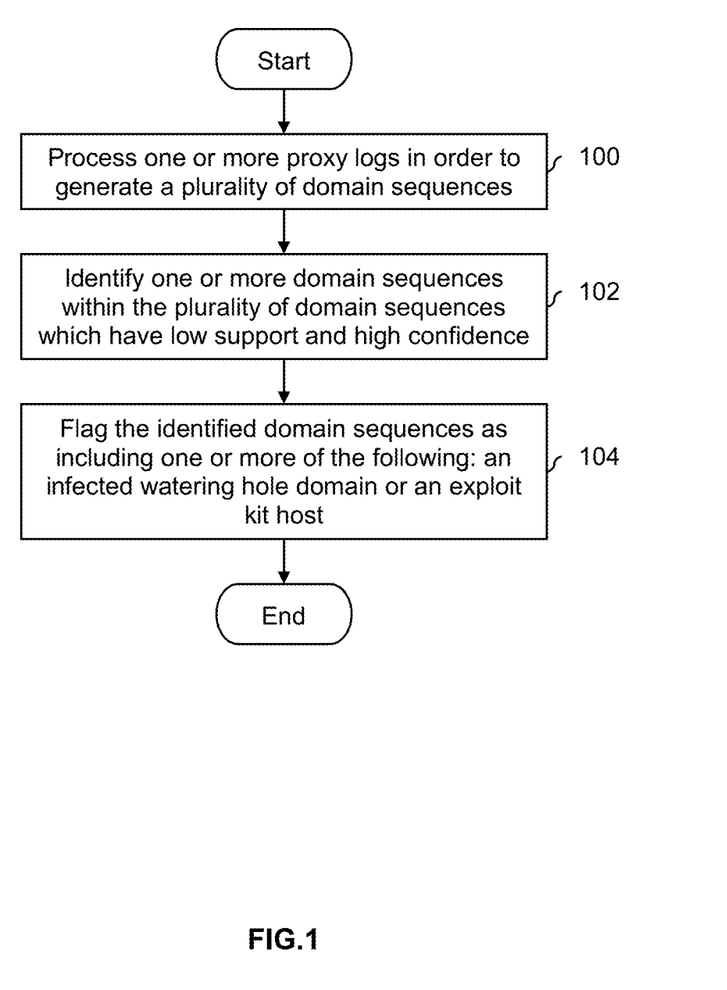
FIG. 1 is a flowchart illustrating an embodiment of a process for detecting watering hole attacks using domain sequences.

FIG. 1 is a flowchart illustrating an embodiment of a process for detecting watering hole attacks using domain sequences. In various embodiments, the process may be performed in a distributed manner (e.g., where every device processes its own proxy logs to detect watering hole attacks) or in a centralized manner (e.g., where multiple devices send their proxy logs to some centralized device which performs watering hole attack detection). Some example systems which perform the process of FIG. 1 are described in more detail below.

At 100, one or more proxy logs are processed in order to generate a plurality of domain sequences. Generally speaking, proxy logs record or otherwise log internal-to-external network connections and may include information such as internal user accounts (e.g., a user name), internal or source domain names, external or destination domain names, and/or connection times. In various embodiments, a domain name (e.g., an internal or external domain name recorded in a proxy log) may include any of the following: an IP address, a host name, or a URL.

As used herein, the term "domain sequences" refers to a sequence of domains. For example, <{A}, {B}> is an example of a domain sequence where A is the first domain in the sequence and B is second domain in the sequence. In the context of this application (i.e., detecting watering hole attacks), a user may have first visited domain A and then visited domain B. The curly brackets "{ }" are used to indicate an itemset where if two items are in the same itemset (e.g., {A, B}) then they have the same sequence number or position within the sequence (e.g., because they occurred at the same time in a proxy log).

At 102, one or more domain sequences within the plurality of domain sequences which have low support and high confidence are identified. The support of a sequential pattern (e.g., <{A}, {B}>=><{C, D}>) is defined as the proportion of sequences that contain that sequence. To put it another way, the support of a sequence approximates the probability or frequency of a particular sequence. For the example sequence <{A}, {B}>=><{C, D}>, it is noted that {A}, {B}, {C, D} need not happen consecutively. That is, there can be other itemsets in between.

The confidence of a sequence is defined as the ratio of the support of the entire sequence (e.g., <{A}, {B}, {C, D}>) to the support of the left-hand-side sequence (e.g., <{A}, {B}>). To put it another way, the confidence estimates the conditional probability of the entire sequence (e.g., <{A}, {B}, {C, D}>) given the left-hand-side sequence (e.g., <{A}, {B}>).

At 104, the identified domain sequences are flagged as including one or more of the following: an infected watering hole domain or an exploit kit host. Further investigation and/or security countermeasures may taken as desired. For example, if the domain sequence <{A}, {B}> is flagged (where domain A is suspected of being infected and domain B is suspected of hosting an exploit kit), then access to domain A and/or domain B may be restricted at least temporarily. For example, a company may configure its firewalls so that employees inside of the firewall cannot access domain A (e.g., at least temporarily until domain A has a clean bill of health), nor can they access domain B (e.g., permanently). In addition to or as an alternative to that, domain B can be scrutinized or investigated further to determine if it is indeed hosting an exploit kit and if appropriate other people, companies, or entities can be notified so that they can protect themselves from domain B.

Figure 2:
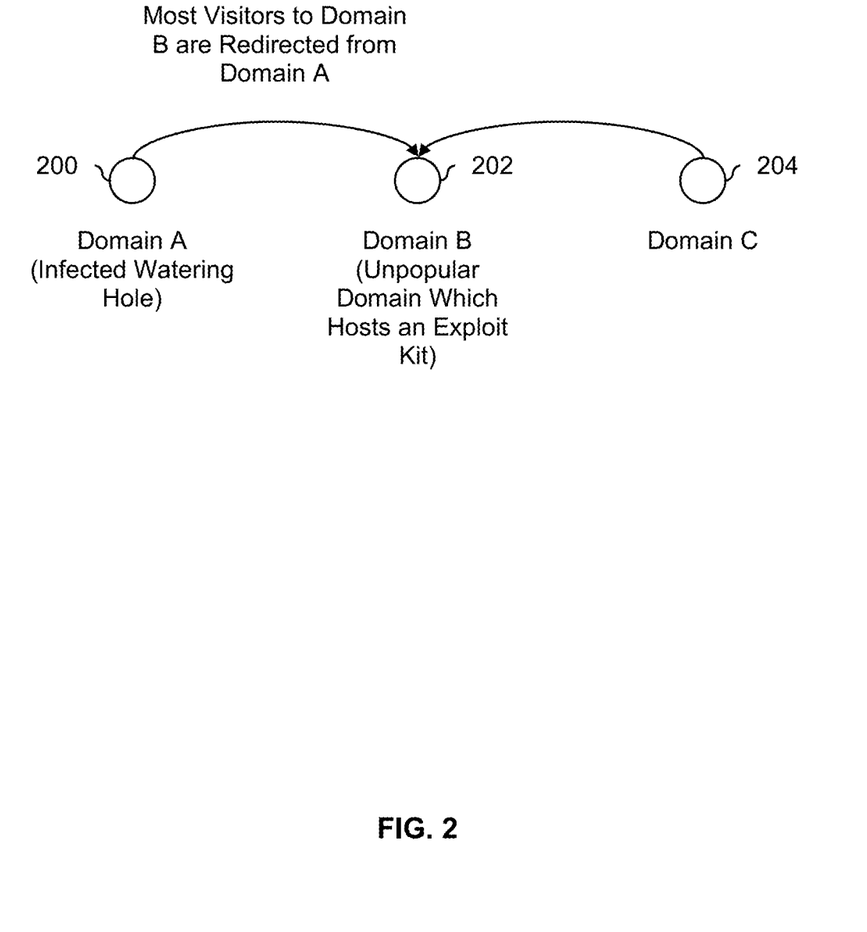
FIG. 2 is a diagram illustrating an embodiment of a low support, high confidence domain sequence.

The following figure shows an example why domain sequences having the properties described in step 102 are identified in order to detect a watering hole attack.

FIG. 2 is a diagram illustrating an embodiment of a low support, high confidence domain sequence. In the example shown, domain A (200) is an infected watering hole. For example, domain A may be outside of some firewall or protected network (not shown), but a user within the protected network accesses the infected watering hole for whatever reason. In some embodiments, the domains shown are websites/webservers.

As a result of the infection, domain A (200) redirects the user to domain B (202) which hosts an exploit kit. The exploit kit is downloaded from domain B (202) to the user's device (not shown) and is used to subsequently steal the credentials of the user (e.g., user name, password, etc.).

Domains which host exploit kits (such as domain B) tend to be unpopular. For example, if all of the domains visited by users in a company over some period of time were examined, the number of times domain B (202) were visited would tend to be low. This is a conceptual example of the first property (i.e., low support) which step 102 in FIG. 1 is looking for. The domain sequence <{A},{B}> will be low support because few people visit domain B which in turn which causes the domain sequence <{A},{B}> to be low.

Another property of the exemplary domains shown is that visitors to domain B (202) B are almost always redirected from domain A (200). For simplicity, assume that there are only three domains total (e.g., globally). Only a few visitors to domain B visited domain C (204) first. This implies that the conditional probability of the sequence <{A}, {B}> given A is high. This is a conceptual example of the second property (i.e., high confidence) which step 102 in FIG. 1 is looking for.

The following figures describe some examples of how domain sequences are generated from proxy logs at step 100 in FIG. 1.

Figure 3:
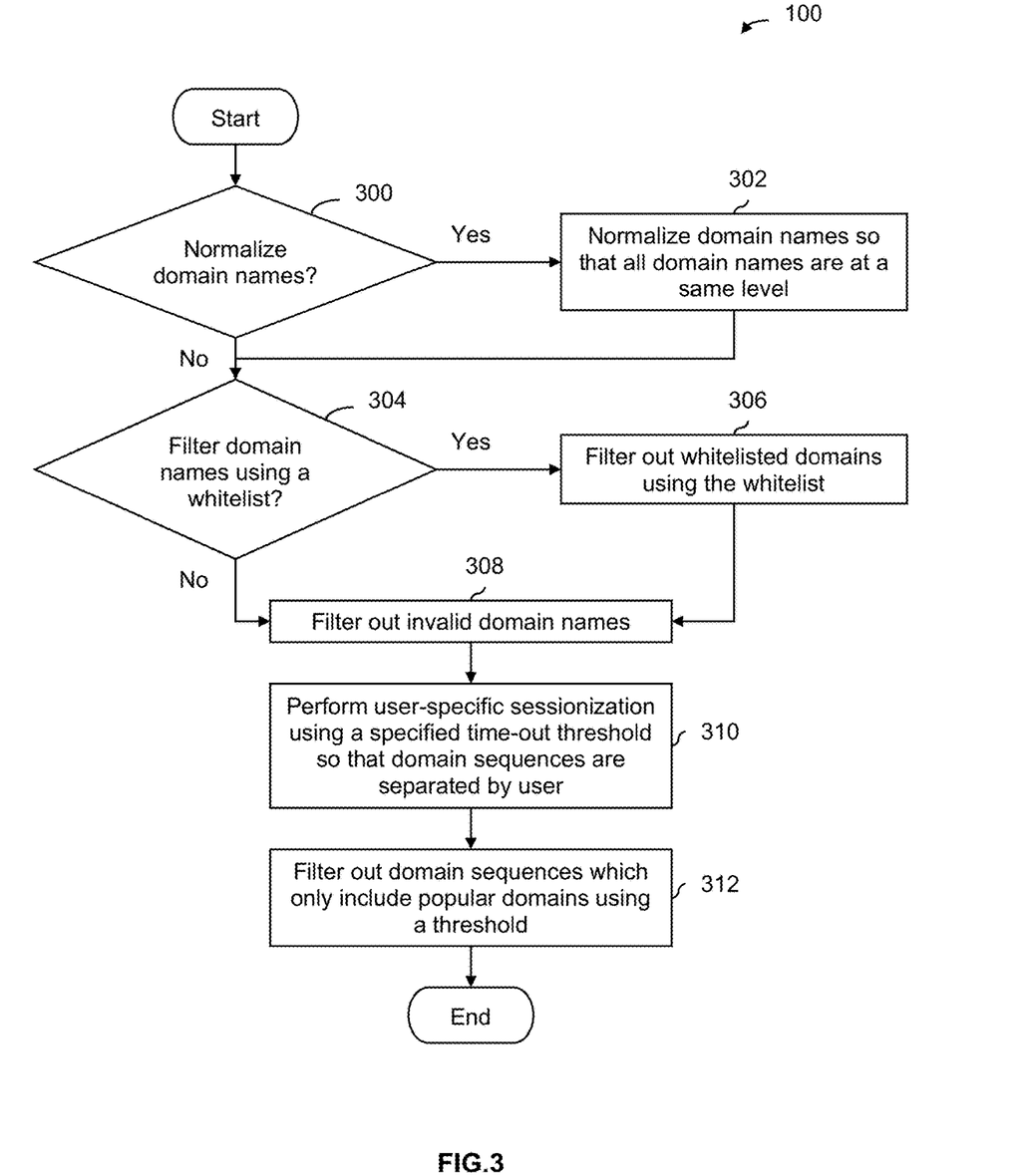
FIG. 3 is a flowchart illustrating an embodiment of a process for generating domain sequences using proxy logs.

FIG. 3 is a flowchart illustrating an embodiment of a process for generating domain sequences using proxy logs. As described above, a proxy log may include user names, source domain names, destination domain names, and/or connection times. In some embodiments, step 100 in FIG. 1 includes the process of FIG. 3. It is noted that the sequence of steps shown herein is merely exemplary and is not intended to be limiting.

At 300, it is decided whether to normalize domain names. In some embodiments, this decision depends on how whitelist filtering is performed (assuming whitelist filtering is performed). For example, in some embodiments, whitelist filtering is performed in a strict manner where a subdomain (e.g., <x>.<y>.<z>) must be explicitly included in a whitelist in order to be considered "safe" even if a related upper level domain (e.g., <y>.<z>) is included in the whitelist. In one example where whitelist filtering is performed in this strict manner, the decision at step 300 is made on a domain-by-domain basis. For example, if at least some part of a domain name is included in the whitelist, then the decision at step 300 would be "Yes" (e.g., so that all levels of a domain name are available so that filtering can be performed properly). If no part of the domain name is included in the whitelist, then normalization is performed. Alternatively, a single decision at step 300 may be made for all domains (i.e., all domain names in the proxy logs are normalized or all domain names in the proxy logs are not normalized).

If it is decided at step 300 to normalize domain names, then at 302 domain names are normalized so that all domain names are at a same level. For example, supposed domain names are normalized to the second level. This would cause the domain name translate.google.com.au to be normalized to google.com.au. In some embodiments, normalization is desirable because it produces a more stable and/or smaller list of domains.

After normalization at step 302, or if it is decided not to normalize at step 300, it is decided whether to filter domain names using a whitelist at 304. If so, whitelisted domains are filtered out using the whitelist at 306. As described above, filtering at step 306 may be performed in as strict or relaxed manner. In one example with strict filtering, suppose a whitelist includes no-ip.com (e.g., which may be a dynamic DNS site) as a whitelisted domain. The domain no-ip.com would be filtered out because it is included in the whitelist (and is therefore believed to be a harmless domain) but its subdomains (e.g., foo.no-ip.com) would not be filtered out. Alternatively, if filtering is performed in a relaxed manner, then all subdomains would be filtered out if a related, higher level domain were included in the whitelist.

After filtering at step 306 or if it is decided not to perform filtering at step 304, invalid domain names are filtered out at 308. For example, a user may have a typographical error and tried to access the domain www.dell,ca (where the comma should be replaced by a period). Domain names which violate some set of rules or go nowhere may be filtered out.

At 310, user-specific sessionization is performed using a specified time-out threshold so that domain sequences are separated by user. Generally speaking, sessionization includes using the specified time-out threshold to decide when a session starts, when it begins, and thus what domains were visited (and in what order) during that session. The sessionization is user-specific because information is divided up according to user so that sessions or information associated with different users are kept separate. This separation of information is done when domain sequences are being formed but information from different users may be combined back together once the domain sequences have been generated.

At 312, domain sequences which only include popular domains are filtered out using a threshold. For example, suppose a threshold of 50 is used. A domain which is visited by fewer than 50 internal IPs or user names is classified as an unpopular domain. If it is visited by more than 50 internal IPs or user names, then it is classified as a popular domain. Any domain sequence which includes only popular domains is deleted at step 310. A domain sequence of (for example) <{google.com}, {youtube.com}> would therefore be deleted since both are popular and have likely been visited by more than 50 internal IPs or user names. This focuses the analysis on domain sequences which include at least one unpopular domain (see, e.g., the low support being searched for at step 102 in FIG. 1).

In some embodiments, using internal IPs or user names (e.g., as opposed to number of visits, without taking into considering internal IP or user name) is desirable because it prevents a single user who visits an unpopular domain many times from causing a domain to be classified as popular when it is in fact visited only by one person.

Returning to step 102 in FIG. 1, in various embodiments, sequential pattern mining may be used (e.g., individually in some embodiments or in combination in some embodiments) to identify domain sequences having the properties described in step 102. In sequential pattern mining, chains of events involving multiple domains (e.g., two, three, four, etc.) are processed and identified. In such embodiments, the process of FIG. 3 may be used to generate domain sequences which satisfy a more general definition of domain sequences (e.g., the sequences may have two itemsets, three itemsets, etc. where each itemset may include one or more domains) since sequential pattern mining is capable of processing such sequences.

Figure 4:
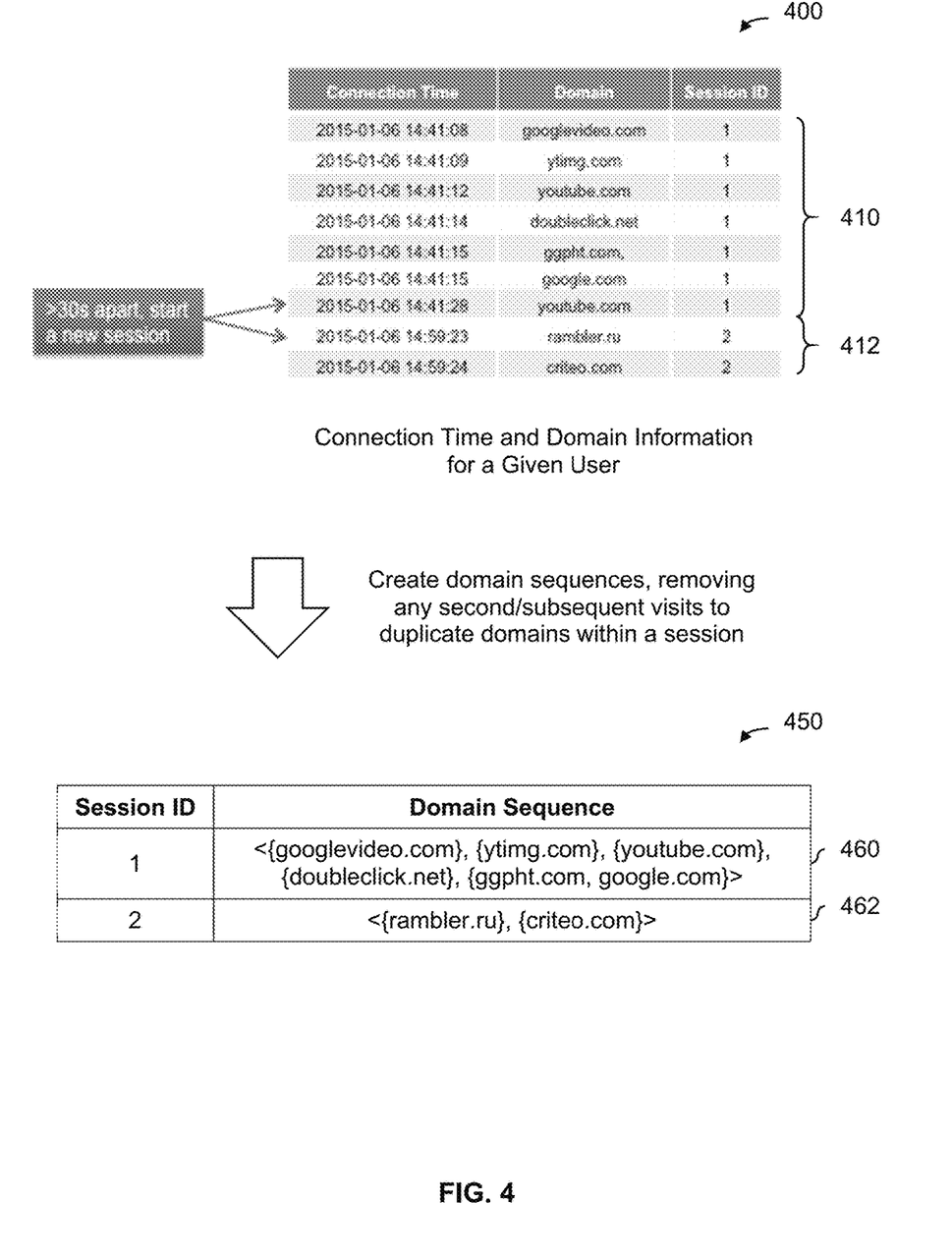
FIG. 4 is a diagram illustrating an embodiment of user-specific sessionization when sequential pattern mining is used.

FIG. 4 is a diagram illustrating an embodiment of user-specific sessionization when sequential pattern mining is used. In some embodiments, the process described in this figure is used at step 310 in FIG. 3.

Diagram 400 shows an example of connection time and domain information for a given (i.e., single) user which is obtained from one or more proxy logs. That is, the information shown in diagram 400 has already been separated according to user.

In the example shown, a 30-second time-out threshold has been specified. As a result, connection times in diagram 400 are examined (e.g., in sorted order) until a gap greater than 30 second is found between successive entries. In this example, such a gap occurs between the domain youtube-.com and rambler.ru. This gap defines the end of one session and the beginning of the next session. As a result, group 410 (which ends with youtube.com, inclusive) is assigned a session ID of 1 and group 412 (which begins which rambler.ru, inclusive) is assigned a session of ID of 2.

Diagram 450 shows the domain sequences which are generated from the information shown in diagram 400. Domain sequence 460 shows the domain sequence for session ID 1 (i.e., group 410) and comprises <{googlevideo.com}, {ytimg.com}, {youtube.com}, {doubleclick-.net}, {ggpht.com, google.com}>. Domain sequence 462 shows the domain sequence for session ID 2 (i.e., group 412) and comprises <{rambler.ru}, {criteo.com}>. It is noted that ggpht.com and google.com in group 410 were visited at the same time (i.e., at 2015-01-06 14:41:15) and so in this example the last itemset in domain sequence 460 includes both of those domains.

In this example, since the domain youtube.com was visited two times in group 410, the second visit (i.e., at connection time 2015-01-06 14:41:28) was deleted from domain sequence 460. In some embodiments, duplicate domains are only removed after sessions are created in order to get a more accurate picture of user activity and more properly create sessions (e.g., if the duplicate domains were removed before sessions were created, then an artificial period of inactivity might appear and the end of a session may be declared prematurely when in fact the user may have just been visiting popular domains).

A time-out threshold of 30 seconds is used in this example because the corresponding redirection from an infected domain (see, e.g., domain A in FIG. 2) to domain which hosts an exploit kit (see, e.g., domain B in FIG. 2) occurs fairly quickly. Naturally, if the infected domain were instead tuned to redirect the visitor to an exploit kit host after a longer period of time (e.g., 1 minute), then the specified time-out threshold could be adjusted accordingly. In various embodiments, the time-out threshold may be obtained from a variety of sources (e.g., some default or pre-defined value, user-defined, etc.).

Figure 5:
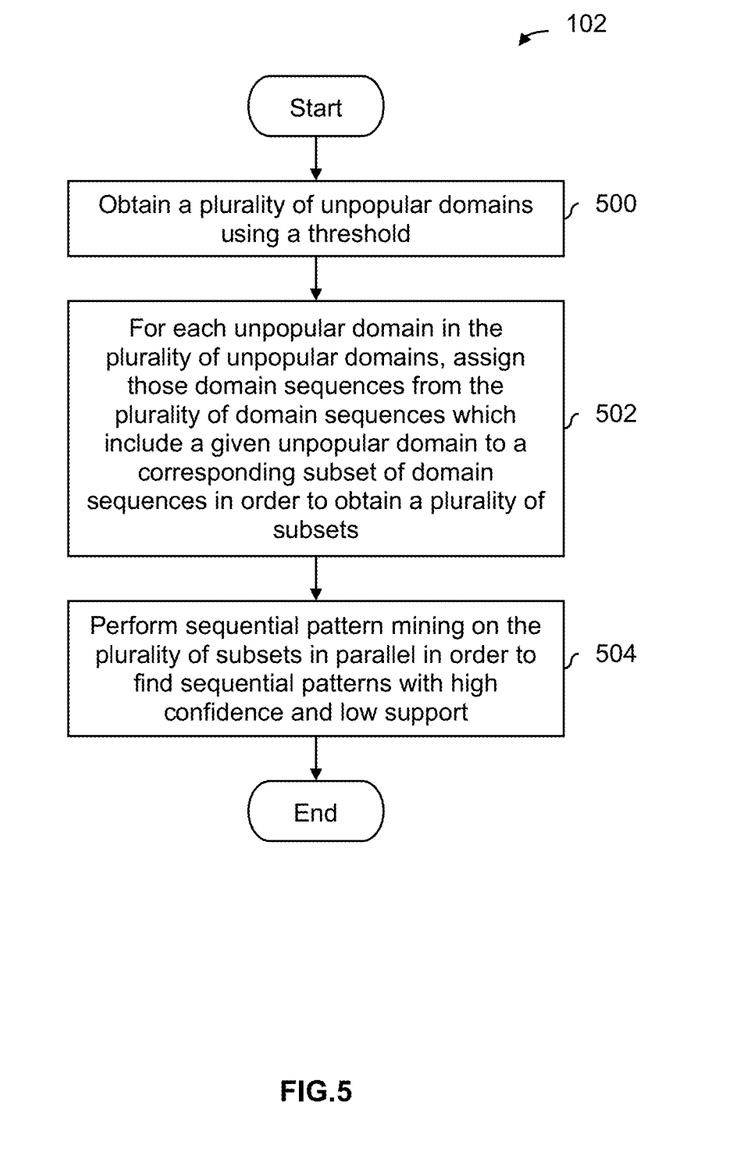
FIG. 5 is a flowchart illustrating an embodiment of a process for identifying high confidence and low support domain sequences using sequential pattern mining.

FIG. 5 is a flowchart illustrating an embodiment of a process for identifying high confidence and low support domain sequences using sequential pattern mining. In some embodiments, the process of FIG. 5 is used at step 102 in FIG. 1.

At 500, a plurality of unpopular domains is obtained using a threshold. In some embodiments, the same threshold from step 312 in FIG. 3 is used (e.g., threshold=50). As described above, the threshold may relate to a number of visits by IP or by user, so that a single user or device cannot artificially make an unpopular domain appear popular.

At 502, for each unpopular domain in the plurality of unpopular domains, those domain sequences from the plurality of domain sequences which include a given unpopular domain are assigned to a corresponding subset of domain sequences in order to obtain a plurality of subsets. The following figure shows an example of this.

Figure 6:
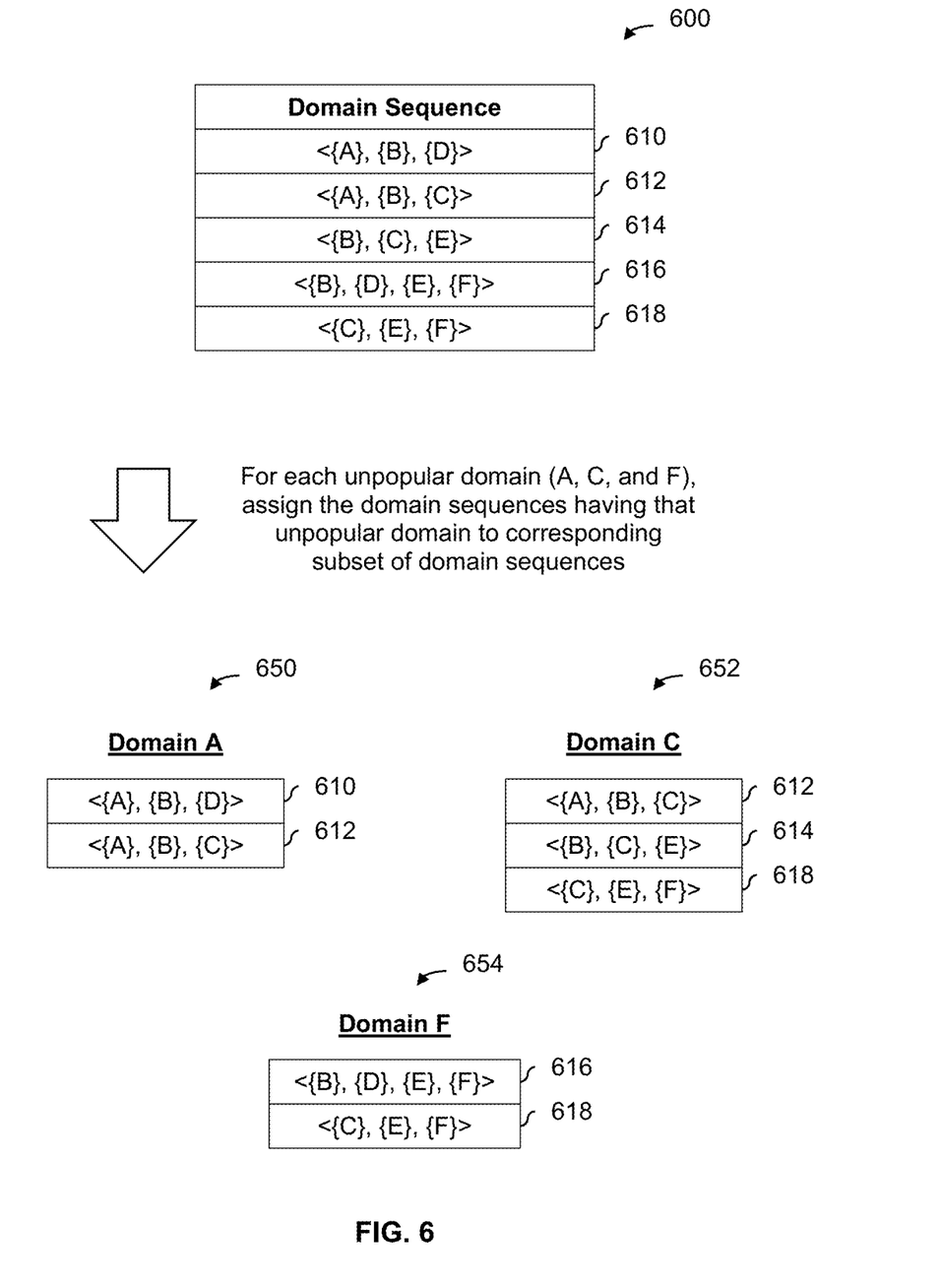
FIG. 6 is a diagram illustrating an embodiment of unpopular domains used to perform sequential pattern mining in parallel.

FIG. 6 is a diagram illustrating an embodiment of unpopular domains used to perform sequential pattern mining in parallel. In the example shown, diagram 600 shows an example of domain sequences. In this example, the unpopular domains are A, C, and F (e.g., based on some threshold). For each unpopular domain, the domain sequences having that unpopular domain are assigned to the corresponding subset of domain sequences. For example, for domain A, subset 650 includes domain sequences 610 and 612 (i.e., all of the domain sequences with A), subset 652 includes domain sequences 612, 614, and 618 (i.e., all of the domain sequences with C), and subset 654 includes domain sequences 616 and 618 (i.e., all of the domain sequences with F). It is noted that a domain sequence may (in some cases) be assigned to two or more subsets.

Returning to FIG. 5, at 504, sequential pattern mining is performed on the plurality of subsets in parallel in order to find sequential patterns with high confidence and low support. For example, in FIG. 6, sequential pattern mining is performed on subsets 650, 652, and 654 in parallel.

Once the domain sequences have been formed (e.g., at step 100 in FIG. 1), it may no longer be necessary to keep information separated or otherwise divided up according to user. As such, the examples of FIG. 5 and FIG. 6 may be performed on domain sequences for multiple users (e.g., without keeping information separated according to user).

In various embodiments, sequential pattern mining at step 504 may be performed in a variety of ways. Some examples are described below.

Sequential Pattern Mining Using R

In one example, R's "arulesSequences" package is used for sequential pattern mining via the use of the PL/R language. High confidence patterns relating to a given set of domains were obtained in parallel by explicit PL/R parallelization, (e.g., sequential pattern mining is run independently on different subsets as in the example of FIG. 6). Some example pseudo-code is:

SELECT a_targeted_domain,
  r_sequential_pattern_mining(param1, param2, . . . )
    FROM input_table It is noted that sequential pattern mining performed in this manner can temporarily consume a large amount of disk space during the process of finding sequential patterns, which requires close monitoring of disk usage. Some extreme cases where the length of sequences relating to a particular domain is long can sometimes cause the R function to crash. As such, in some embodiments R's sequential pattern mining is limited to sequences of limited length (e.g., having a few hundred domains or less). For example, FIG. 3 may be modified to use a maximum sequence length threshold to filter out domain sequences which are too long.

Sequential Pattern Mining in SQL

To overcome the limitation of R's SPM function, a version of sequential pattern mining using plain SQL was implemented in a second embodiments. The SQL implementation follows the Apriori principle (as does R's SPM function) where if a sequence is not frequent, then none of its super-sequences is frequent. For example, if <{A}, {B}> is infrequent (i.e., it has low support), then <{A}, {B}, {C}> is infrequent as well. Given sequences found so far, the function grows each sequence by 1 itemset at each iteration, using Apriori-based candidate sequence generation. In addition, the function also prunes sequences that do not meet the minimum-number-of-user condition (e.g., sequences of a single user are generally not interesting and therefore can be pruned).

The SQL version of the sequential pattern mining function can process sequences with tens of thousands of domains in a few minutes in a massively parallel database, such as the Pivotal Greenplum database. In some embodiments it may be undesirable to run the function on long sequences for several subsets in parallel due to the $O(N^k)$ space complexity, where N is the number of domains and k the maximum length of sequences. For domains with sequences of moderate length (e.g., including a total of less than 1,000 domains in all sequences relating to a given subset), the function took less than an hour to extract sequential patterns for ~140K subsets in parallel. If desired, a maximum sequence length threshold may be adjusted to control disk usage.

By dividing up the plurality of domain sequences into subsets and performing sequential pattern mining in parallel (see, e.g., FIG. 6), the process is set up to take advantage of massively parallel databases, such as Pivotal Greenplum. In a typical environment, the amount of information which must be processed in order to detect a watering hole attack is quite large. Dividing up the plurality of domain sequences into subsets and using a massively parallel database to perform the sequential pattern mining is attractive because it enables the detection process to be completed in a reasonable amount of time.

The following figures describe examples of a relative confidence metric and why it may be desirable to use a relative confidence metric (e.g., instead of a straightforward or simple confidence) when performing sequential pattern mining (e.g., at step 504 in FIG. 5).

Figure 7:
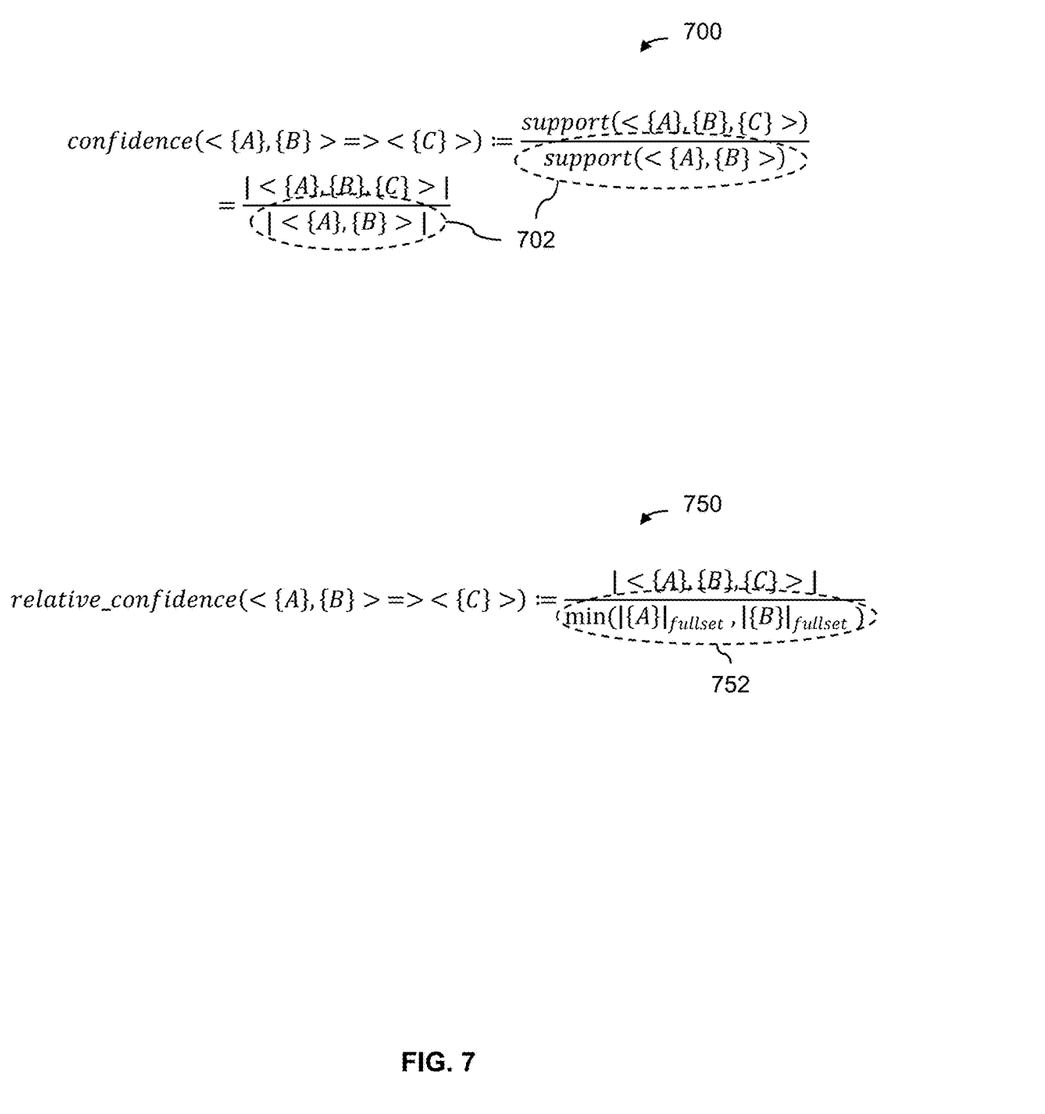
FIG. 7 is a diagram illustrating an embodiment of a confidence metric and a relative confidence metric.

FIG. 7 is a diagram illustrating an embodiment of a confidence metric and a relative confidence metric. In the example shown, diagram 700 shows a confidence metric and diagram 750 shows a relative confidence metric. The denominator (702) of the confidence metric shown in diagram 700 is measured with respect to a particular subset. For example, in FIG. 7, if a confidence is being calculated for subset 650, then the denominator of the confidence will only depend upon sequence domains 610 and 612. Similarly, if a confidence is being calculated for subset 652 (i.e., associated with unpopular domain C), then the denominator of the confidence will only depend upon sequence domains 612, 614, and 618.

Suppose the frequency or popularity of domain sequences in a particular subset do not match the frequency or popularity within the complete set of domain sequences. To put it another way, the number of sequences in a subset being processed that contain the left-hand-side sequence <{A}, {B}> may not reflect the popularity of <{A},{B}> in the full dataset. For example, <{A},{B}> may be a subsequence that appears in many sequences in the full dataset (i.e., it is popular in the full dataset), but in one of the subsets being processed, there may not be many "hits" for <{A},{B}>, causing the confidence value of the pattern <{A}, {B}>=><{C}> to be artificially high. Such an artificially high confidence may in turn cause the sequence <{A}, {B}>=><{C}> to be flagged as one which includes an infected domain and/or a malicious domain which hosts an exploit kit, when in fact that domain sequence should be eliminated from consideration.

Thus, in some embodiments it may be desirable to use a relative confidence metric such as that shown in diagram 750 when performing sequential pattern mining. The exemplary relative confidence shown favors sequential patterns whose left-hand-side sequences contain less popular domains within the context of the entire dataset. Note that the denominator (752) in the relative confidence metric takes into account the popularity of A and B within the full dataset (e.g., the domain sequences shown in diagram 600 in FIG. 6), as opposed to a particular subset (e.g., just subset 650, or just subset 652, etc. in FIG. 6). The notation $|\bullet|_{fullset}$ is the number of sequences in the full dataset that contain a specified item. If items A and B are both popular in the full dataset, then the denominator (752) of the relative confidence will have a high value, leading to a small relative confidence, making that domain sequences have a lower priority for investigation (which is as it should be).

Figure 8:
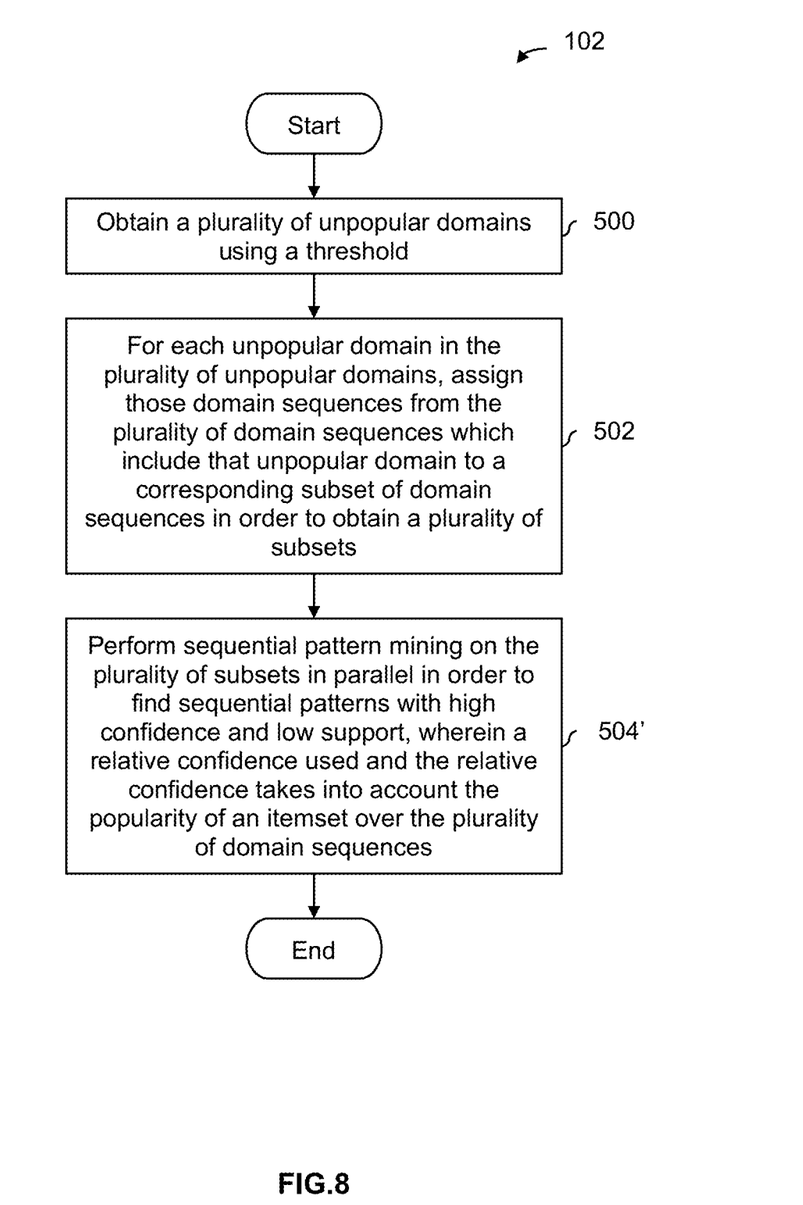
FIG. 8 is a flowchart illustrating an embodiment of a process for identifying high relative confidence and low support domain sequences using sequential pattern mining.

FIG. 8 is a flowchart illustrating an embodiment of a process for identifying high relative confidence and low support domain sequences using sequential pattern mining. In some embodiments, the process of FIG. 8 is used at step 102 in FIG. 1. FIG. 5 and FIG. 8 are similar and the numbering of steps reflects identical or related steps.

At 500, a plurality of unpopular domains is obtained using a threshold.

At 502, for each unpopular domain in the plurality of unpopular domains, those domain sequences from the plurality of domain sequences which include that unpopular domain are assigned to a corresponding subset of domain sequences in order to obtain a plurality of sub sets.

At 504', sequential pattern mining is performed on the plurality of subsets in parallel in order to find sequential patterns with high confidence and low support, wherein a relative confidence used and the relative confidence takes into account the popularity of an itemset over the plurality of domain sequences. For example, the relative confidence metric 750 shown in FIG. 7 may be used to prevent some "false positive" domain sequences from being flagged as a watering hole attack.

Figure 9:
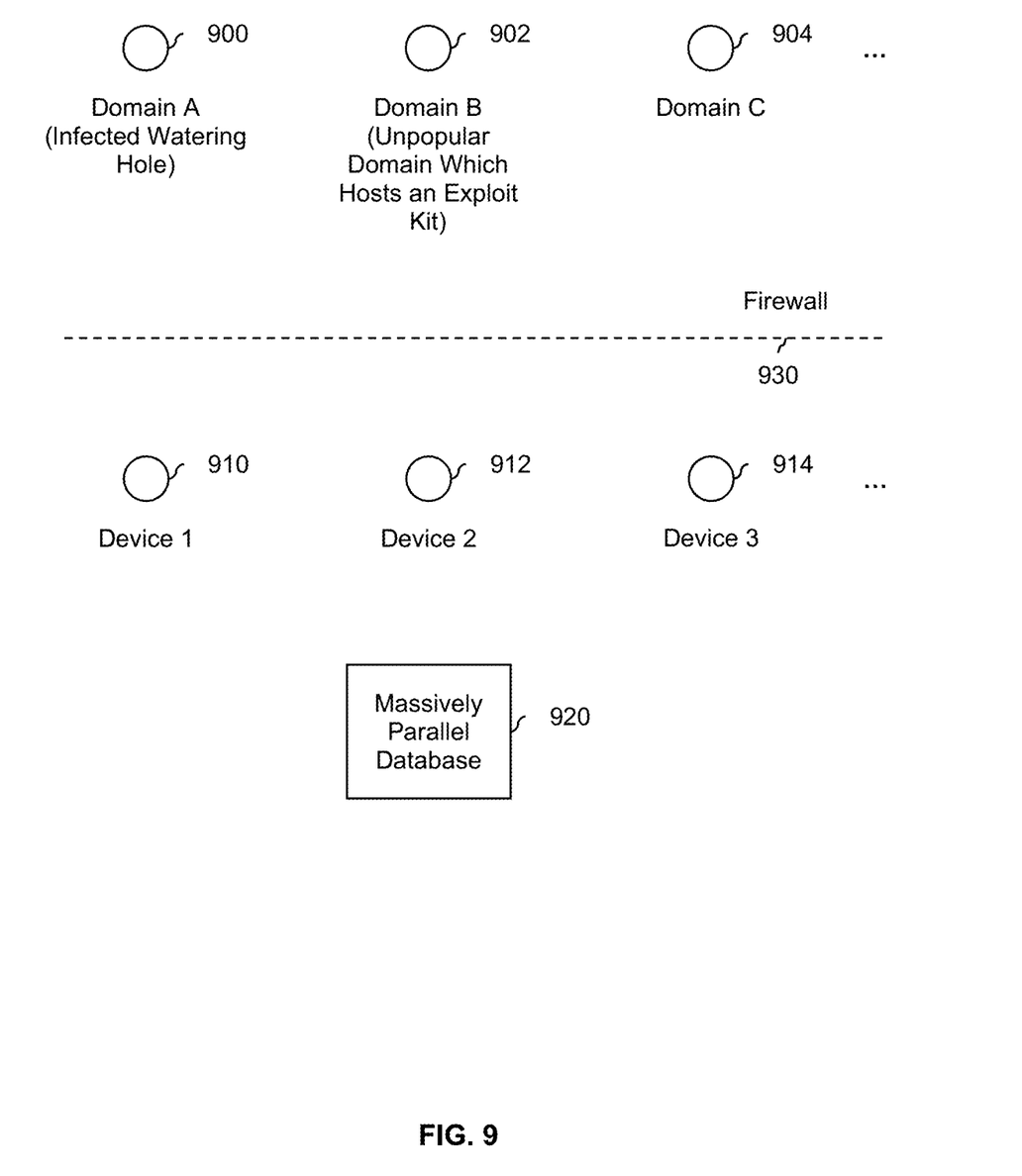
FIG. 9 is a diagram illustrating an embodiment of a system which detects watering hole attacks using sequences.

The following figure shows an example of a system which performs watering hole attack detection in the manner described above.

FIG. 9 is a diagram illustrating an embodiment of a system which detects watering hole attacks using sequences. In the example shown, devices 910, 912, and 914 are behind a firewall (930). For example, the devices may be computers, mobile telephones, or other devices owned by a company and/or used by the company's employees. The users of devices 910, 912, and 914, visit domains 910, 902, and 904 which include an infected watering hole (900) and a domain which hosts an exploit kit (902). Devices 910, 912, and 914 send their proxy logs to massively parallel database 920 which performs watering hole detection using one or more of the embodiments described above.

Figure 10:
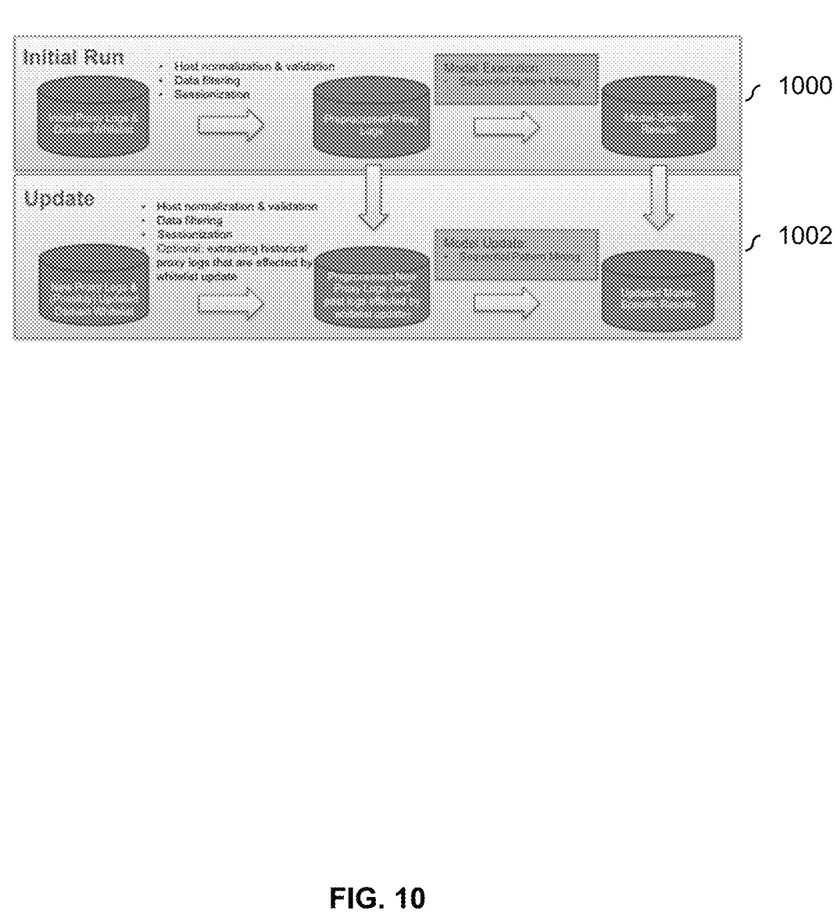
FIG. 10 is a diagram illustrating an embodiment of watering hole attack detection process which is performed periodically using incremental proxy log information.

In some embodiments, proxy logs are periodically sent from devices 910, 912, and 914 to massively parallel database 920 (e.g., containing incremental information that occurred since the last proxy log was sent) and watering hole attack detection is performed on a periodic basis. This may be desirable because it keeps the amount of ingested proxy log information to a reasonable amount of information and the run times are correspondingly reasonable. The following figure shows an example of how such a process may be performed.

FIG. 10 is a diagram illustrating an embodiment of watering hole attack detection process which is performed periodically using incremental proxy log information. In the example shown, the top row (1000) shows an initial run and the bottom row (1002) shows an update. At the initial run, an initial set of proxy logs and an initial whitelist are input. Host normalization, host validation, data filtering, and sessionization (described above) are performed (in this example at least) to obtain preprocessed proxy logs. One or more models are performed, such as sequential pattern mining. This produces model-specific results (i.e., domain sequences with low support and high confidence, at least according to a particular model).

During an update, new proxy logs (e.g., containing incremental information that subsequently occurred since the last set of proxy logs) and (possibly) an updated whitelist are input. As during the initial run, host normalization, host validation, data filtering, and sessionization are performed to obtain new, preprocessed proxy logs. Optionally, historical proxy logs may be processed using the updated whitelist. The models (e.g., sequential pattern mining) are then updated to obtain updated model-specific results.

For sequential pattern mining, the model update may include merging the new results obtained from the new data with the existing results. For example, this may involve a summation of sequence counts from two sets of results for the recalculation of support and confidence measures. Domain sequences (e.g., after the support and confidence metrics are recalculated) that satisfy some threshold with respect to the support and confidence may then be flagged.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor; and
   a memory coupled with the processor, wherein the memory is configured to provide the processor with instructions which when executed cause the processor to:
      generate a plurality of domain sequences from processing proxy logs, wherein a domain sequence comprises a sequence of two or more domains that were accessed in sequential order within a selected timeout;
      identify using sequential pattern mining in parallel of subsets of said plurality of domain sequences one or more domain sequences within the plurality of domain sequences which have low support and high confidence; and
      flag the identified domain sequences as likely including one or more of the following: an infected watering hole domain or an exploit kit host restrict access by users to said flagged identified domain sequences; and
      restrict access by users to said flagged identified domain sequences;
      analyze said flagged identified domain sequences to determine whether said sequences include either an infected watering hole or an exploit kit host;
      deciding whether to normalize domain names;
      in the event it is decided to normalize domain names, normalizing domain names so that all domain names are at a same domain name level;
      deciding whether to filter domain names using a whitelist;
      in the event it is decided to filter domain names using the whitelist, filtering out whitelisted domains as being harmless using the whitelist;
      filtering out invalid domain names; performing user-specific sessionization using a specified time-out threshold so that domain sequences are separated by user; and
      filtering out domain sequences which only include popular domains using a as indicated by accesses greater than a predetermined threshold.

2. The system recited in claim 1, wherein identifying sequences includes:
   obtaining a plurality of unpopular domains using a based upon accesses below a predetermined threshold;
   for each unpopular domain in the plurality of unpopular domains, assigning those domain sequences from the plurality of domain sequences which include a given unpopular domain to a corresponding subset of domain sequences in order to obtain a plurality of subsets; and
   performing sequential pattern mining on the plurality of subsets in parallel in order to find sequential patterns with high confidence and low support.

3. The system recited in claim 2, wherein a relative confidence is used to perform sequential pattern mining and the relative confidence takes into account the popularity of an itemset over the plurality of domain sequences.

4. The system recited in claim 1, wherein the system includes a massively parallel database.

5. A method, comprising:
   generating a plurality of domain sequences from processing proxy logs, wherein a domain sequence comprises a sequence of two or more domains that were accessed in sequential order within a selected timeout interval;

identifying using sequential pattern mining in parallel of subsets of said plurality of domain sequences one or more domain sequences within the plurality of domain sequences which have low support and high confidence;

analyzing said flagged identified domain sequences to determine whether said sequences include either an infected watering hole or an exploit kit host;

deciding whether to normalize domain names;

in the event it is decided to normalize domain names, normalizing domain names so that all domain names are at a same domain name level;

deciding whether to filter domain names using a whitelist;

in the event it is decided to filter domain names using the whitelist, filtering out whitelisted domains as being harmless using the whitelist;

filtering out invalid domain names; performing user-specific sessionization using a specified time-out threshold so that domain sequences are separated by user; and filtering out domain sequences which only include popular domains using a as indicated by accesses greater than a predetermined threshold.

6. The method recited in claim 5, wherein identifying sequences includes:

obtaining a plurality of unpopular domains using a based upon accesses below a predetermined threshold;

for each unpopular domain in the plurality of unpopular domains, assigning those domain sequences from the plurality of domain sequences which include a given unpopular domain to a corresponding subset of domain sequences in order to obtain a plurality of subsets; and performing sequential pattern mining on the plurality of subsets in parallel in order to find sequential patterns with high confidence and low support.

7. The method recited in claim 6, wherein a relative confidence is used to perform sequential pattern mining and the relative confidence takes into account the popularity of an itemset over the plurality of domain sequences.

8. The method recited in claim 5, wherein the method is performed by a massively parallel database.

9. A computer program product, the computer program product being embodied in a non-transitory computer readable storage medium and comprising computer instructions for:

generating a plurality of domain sequences from processing proxy logs, wherein a domain sequence comprises a sequence of two or more domains that were accessed in sequential order within a selected timeout interval;

identifying using sequential pattern mining in parallel of subsets of said plurality of domain sequences one or more domain sequences within the plurality of domain sequences which have low support and high confidence;

flagging the identified domain sequences as likely including one or more of the following: an infected watering hole domain or an exploit kit host;

restricting access by users to said flagged identified domain sequences;

analyzing said flagged identified domain sequences to determine whether said sequences include either an infected watering hole or an exploit kit host;

deciding whether to normalize domain names;

in the event it is decided to normalize domain names, normalizing domain names so that all domain names are at a same domain name level;

deciding whether to filter domain names using a whitelist;

in the event it is decided to filter domain names using the whitelist, filtering out whitelisted domains as being harmless using the whitelist;

filtering out invalid domain names; performing user-specific sessionization using a specified time-out threshold so that domain sequences are separated by user; and filtering out domain sequences which only include popular domains using a as indicated by accesses greater than a predetermined threshold.

10. The computer program product recited in claim 9, wherein identifying sequences includes:

obtaining a plurality of unpopular domains using a based upon accesses below a predetermined threshold;

for each unpopular domain in the plurality of unpopular domains, assigning those domain sequences from the plurality of domain sequences which include a given unpopular domain to a corresponding subset of domain sequences in order to obtain a plurality of subsets; and performing sequential pattern mining on the plurality of subsets in parallel in order to find sequential patterns with high confidence and low support.

11. The computer program product recited in claim 10, wherein a relative confidence is used to perform sequential pattern mining and the relative confidence takes into account the popularity of an itemset over the plurality of domain sequences.

* * * * *